United States Patent [19]

Kresta et al.

[11] 4,051,292

[45] Sept. 27, 1977

[54] PNEUMATIC TIRE BLANKS AND PROCESS

[75] Inventors: Erich Kresta, Perchtoldsdorf; Werner Gorter, Baden, both of Austria

[73] Assignee: Semperit Aktiengesellschaft, Vienna, Austria

[21] Appl. No.: 337,610

[22] Filed: Mar. 2, 1973

[30] Foreign Application Priority Data

Feb. 29, 1972 Austria ................................. 1648/72

[51] Int. Cl.² .......................... B32B 7/02; B60C 15/00
[52] U.S. Cl. ............................. 428/212; 152/362 R; 428/218; 428/492; 428/493; 428/521
[58] Field of Search ................. 425/17, 19, 20, 21, 425/22, 23, 24, 25; 161/254, 256, 166, 240; 152/362 R; 428/212, 218, 493, 521, 492

[56] References Cited

U.S. PATENT DOCUMENTS

| 2,825,382 | 3/1958 | Peterson | 161/240 |
| 2,834,049 | 5/1958 | White | 425/21 |
| 2,854,692 | 10/1958 | Robbins | 425/24 |
| 3,106,950 | 10/1963 | Ernst | 161/240 |
| 3,372,078 | 3/1968 | Fausti | 161/166 |
| 3,712,360 | 1/1973 | Torti | 161/254 |
| 3,933,553 | 1/1976 | Seiberling | 156/123 |
| 3,933,566 | 1/1976 | Seiberling | 241/153 |

Primary Examiner—Ellis Robinson
Attorney, Agent, or Firm—Werner W. Kleeman

[57] ABSTRACT

The present invention relates to a pneumatic tire blank adapted to be vulcanized in a vulcanizing device of the kind not employing a bellows arrangement, but having a clamping system which acts upon the interior of the bead.

5 Claims, 5 Drawing Figures

PNEUMATIC TIRE BLANKS AND PROCESS

BACKGROUND OF THE INVENTION

The known methods for the vulcanising of tires can be subdivided into two groups, namely vulcanising with a bellows arrangement and vulcanising without a bellows arrangement.

In vulcanising with a bellows arrangement, there are a number of serious disadvantages, for example, the fact that the bellows have to be replaced after a relatively short service life, so that there has been an increasing tendency towards carrying out the vulcanising of tires without the use of such a bellows arrangement.

In known vulcanising devices not using bellows i.e. bellowless devices, a tire blank is pressed, in the neighbourhood of the tire bead and by means of substantially disc shaped clamping arrangements, against the bead sections of a vulcanising mold.

It has been found disadvantageous in this context that the tire blank, during the vulcanising operation, is completely covered in the bead zone and the vulcanising medium cannot therefore penetrate to it, so that temperature gradients occur in the tire bead which result in a substantial impairment of its quality.

SUMMARY OF THE INVENTION

An object of the present invention is to provide a pneumatic tire blank which is suitable for vulcanising without the need for a bellows arrangement and which overcomes the disadvantage heretofore present because of the temperature gradients produced by the pressure plates.

The invention consists in a pneumatic tire blank adapted to be vulcanised in a vulcanising device of the kind not employing a bellows arrangement but having a clamping system which acts upon the interior of the bead, wherein the pneumatic tire blank has sections circumferentially engaged by the clamping arrangement which consist of a material which vulcanises more rapidly than the remainder of the blank.

The more rapidly vulcanising section of the material is preferably a strip which forms part of the inner lamina of the tire blank and may conveniently cover the blank in the bead area on the tire interior.

In a preferred embodiment there is provided in the bead zone a section of material extending over the entire thickness of the tire and vulcanising more rapidly than the rest of the blank.

In another embodiment, a more rapidly vulcanising section of material is wrapped around the bead zone in the form of an envelope.

By forming the tire blank in accordance with the invention, it requires an amount of heat to vulcanise it in the zone covered by the clamping system which is smaller than the amount of heat drawn from it by the clamping system.

BRIEF DESCRIPTION OF THE DRAWINGS

Exemplary embodiments of the invention will now be described with reference to the drawings forming part of this specification, in which.

DETAILED DESCRIPTION OF THE PREFERRED EMBODIMENTS

Figure 1:
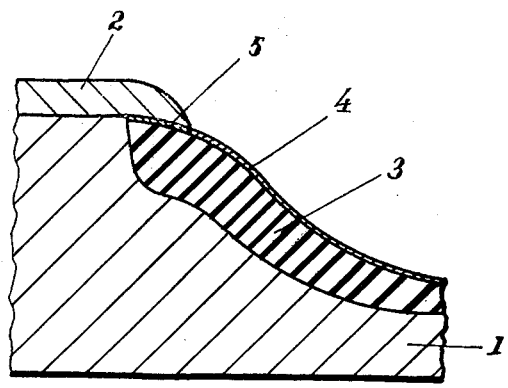
FIG. 1 is part section through a vulcanising mold and a tire blank.

FIG. 1 shows a mold half 1, a clamping system 2 and tire blank 3.

In this embodiment that part of the internal lamina 4 located in the zone of the clamping system 2, is made of a section of material 5 which vulcanises more rapidly than the remainder of the tire.

Figure 2:
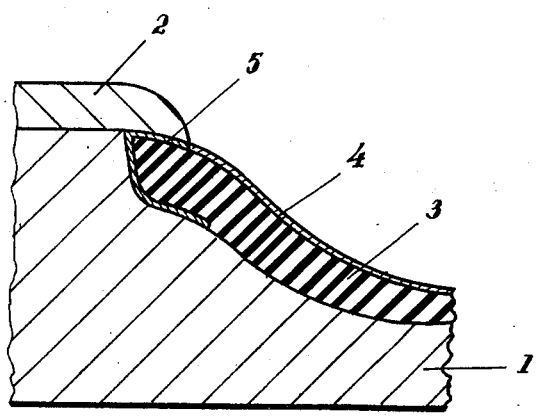
FIGS. 2 to 5 are partial sections in the bead zone, through further embodiments of tire blanks.

By contrast, in the embodiment shown in FIG. 2, the bead zone of the tire blank 3 is embraced in envelope fashion by the more rapidly vulcanising section of material 5. The layer 5 can form part both of the internal lamina 4 and of a separate strip.

Figure 3:
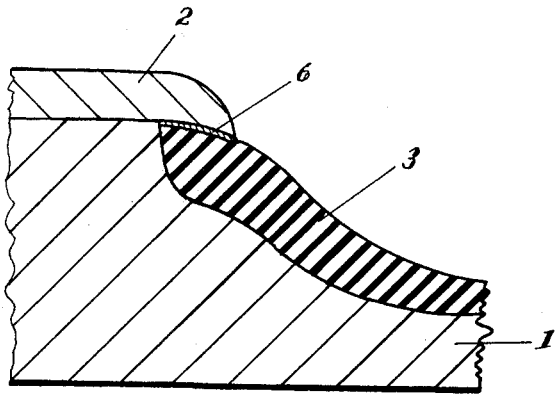

FIG. 3 shows such a strip 6, serving as the only more rapidly vulcanising layer, and providing masking against the clamping system 2.

Figure 4:
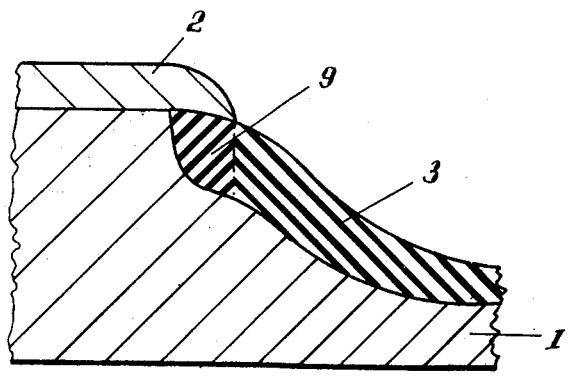

FIG. 4 shows an embodiment of a tire blank 3 in accordance with the invention, the more rapidly vulcanising material section 9 of which extends through the full thickness of the tire in the bead zone.

Figure 5:
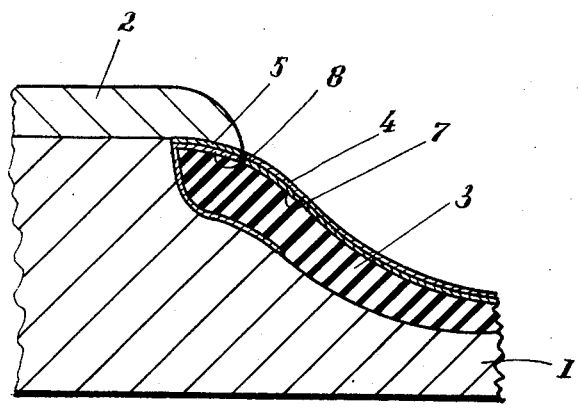

FIG. 5 shows a tire blank 3 in which the inner lamina 4 an the first layer 7 have sections of material 5 and 8 respectively, in the bead zone, which vulcanise more rapidly.

The more rapidly vulcanising sections of material shown in cross-section in the figures of the drawing, extend of course around the entire bead circumference.

What is claimed is:

1. A pneumatic tire blank for vulcanization in a bellowless vulcanizing device having a clamping system, said tire blank comprising a bead region which circumferentially engages said clamping system when positioned therein, the bead region of the tire blank being formed of a first vulcanizable material positioned only at the bead region of the tire blank, a second vulcanizable material forming the remaining portions of the tire blank, said first vulcanizable material being vulcanizable more rapidly than the second vulcanizable material, whereby vulcanization of the entire tire blank in said clamping system is effected in a manner which precludes the adverse effects of temperature gradients produced in the tire blank by the engagement of the clamping system against the bead region.

2. A pneumatic tire blank as claimed in claim 1, wherein the more rapidly vulcanising sections of material consist of a strip which forms part of the internal lamina of the tire blank.

3. A pneumatic tire blank as claimed in claim 1, wherein the more rapidly vulcanising sections of material extend through the full thickness of the bead zone.

4. A pneumatic tire blank as claimed in claim 1, wherein the more rapidly vulcanising sections of material embrace the bead zone in envelope fashion.

5. An unvulcanized tire blank comprising one or more layers of vulcanizable material forming the blank body, and a circumferentially disposed layer only at the bead zone of said blank made of a vulcanizable material which is vulcanizable more rapidly than the remaining layer(s) of said blank.

* * * * *